(12) United States Patent
Wang et al.

(10) Patent No.: US 9,136,896 B2
(45) Date of Patent: Sep. 15, 2015

(54) BACK COVER STRUCTURE

(71) Applicant: TAER INNOVATION CO., LTD., New Taipei (TW)

(72) Inventors: Chih-Sheng Wang, New Taipei (TW); Yu-Chun Lu, New Taipei (TW)

(73) Assignee: TAER INNOVATION CO., LTD., New Taipei (TW)

( * ) Notice: Subject to any disclaimer, the term of this patent is extended or adjusted under 35 U.S.C. 154(b) by 175 days.

(21) Appl. No.: 13/965,292

(22) Filed: Aug. 13, 2013

(65) Prior Publication Data

US 2014/0329571 A1    Nov. 6, 2014

Related U.S. Application Data

(60) Provisional application No. 61/818,930, filed on May 3, 2013.

(51) Int. Cl.
| | |
|---|---|
| *H04M 1/00* | (2006.01) |
| *H04B 1/3888* | (2015.01) |
| *H04B 1/3827* | (2015.01) |
| *A45C 11/00* | (2006.01) |
| *A45C 13/08* | (2006.01) |
| *H04M 1/02* | (2006.01) |

(52) U.S. Cl.
CPC .............. *H04B 1/3888* (2013.01); *A45C 11/00* (2013.01); *A45C 13/08* (2013.01); *H04B 1/385* (2013.01); *H04M 1/0283* (2013.01); *A45C 2011/002* (2013.01); *A45C 2011/003* (2013.01)

(58) Field of Classification Search
USPC .................................. 455/550.1, 575.1, 575.8
See application file for complete search history.

(56) References Cited

U.S. PATENT DOCUMENTS

| | | | | |
|---|---|---|---|---|
| 4,744,497 | A * | 5/1988 | O'Neal | 224/587 |
| 2002/0195845 | A1 * | 12/2002 | Southwick | 297/188.06 |
| 2003/0094561 | A1 * | 5/2003 | Fields | 248/690 |
| 2007/0235493 | A1 * | 10/2007 | Fortson | 224/930 |
| 2013/0206614 | A1 * | 8/2013 | O'Neill et al. | 206/216 |
| 2014/0120983 | A1 * | 5/2014 | Lam | 455/557 |

\* cited by examiner

*Primary Examiner* — Fayyaz Alam (74) *Attorney, Agent, or Firm* — Li & Cai Intellectual Property (USA) Office (57) ABSTRACT

A back cover structure disposed on the back of the portable electronic device includes a cover body, a plurality of replaceable adornments and a switching structure. The cover body has an outer surface, an inner surface opposite to the outer surface and facing the portable electronic device, and a through hole passing through the cover body and connected between the outer surface and the inner surface. The replaceable adornments are applied to the cover body, and any one of the replaceable adornments is adapted to and detachably disposed in the through hole of the cover body according to different requirements. The switching structure is disposed on the inner surface of the cover body to secure the replaceable adornment on the cover body or release the replaceable adornment from the cover body.

18 Claims, 13 Drawing Sheets

BACK COVER STRUCTURE

BACKGROUND OF THE INVENTION

1. Field of the Invention

The instant disclosure relates to a back cover structure, and more particularly to a back cover structure disposed on the back of a portable electronic device.

2. Description of Related Art

Portable electronic devices, such as a mobile phone, a media player, and a personal digital assistant (PDA) are increasingly thinner and smaller. However, the portable electronic device cannot show different decorative appearances according to use's preference.

SUMMARY OF THE INVENTION

One aspect of the instant disclosure relates to a back cover structure disposed on the back of a portable electronic device.

One of the embodiments of the instant disclosure provides a back cover structure disposed on the back of a portable electronic device, comprising: a cover body, a plurality of replaceable adornments and a switching structure. The cover body has an outer surface, an inner surface opposite to the outer surface and facing the portable electronic device, and a through hole passing through the cover body and connected between the outer surface and the inner surface. The replaceable adornments are applied to the cover body, and one of the replaceable adornments is detachably disposed in the through hole of the cover body. The switching structure is disposed on the inner surface of the cover body to secure the replaceable adornment on the cover body or release the replaceable adornment from the cover body.

Another one of the embodiments of the instant disclosure provides a back cover structure disposed on the back of a portable electronic device, comprising: a cover body, a replaceable adornment and a switching structure. The cover body has an outer surface, an inner surface opposite to the outer surface and facing the portable electronic device, and a through hole passing through the cover body and connected between the outer surface and the inner surface. The replaceable adornment is detachably disposed in the through hole of the cover body. The switching structure is disposed on the inner surface of the cover body to secure the replaceable adornment on the cover body or release the replaceable adornment from the cover body.

Yet another one of the embodiments of the instant disclosure provides a back cover structure disposed on the back of a portable electronic device, comprising: a cover body, a replaceable adornment and a switching structure. The cover body has an outer surface, an inner surface opposite to the outer surface and facing the portable electronic device, and a through hole passing through the cover body and connected between the outer surface and the inner surface. The replaceable adornment is adapted to the through hole of the cover body, and the replaceable adornment includes a base seat having a necklace hole passing through the base seat. The switching structure is disposed on the inner surface of the cover body to release the replaceable adornment from the cover body, wherein the replaceable adornment is separated from the cover body, and a necklace passes through the necklace hole of the base seat of the replaceable adornment.

More precisely, the replaceable adornment includes a base seat having a first retaining structure and the switching structure has a second retaining structure corresponding to the first retaining structure of the base seat, thus the switching structure is rotated to a lock position for securing the replaceable adornment in the through hole of the cover body by matching the first retaining structure with the second retaining structure, or the switching structure is rotated to a unlock position for releasing the replaceable adornment from the cover body by separating the first retaining structure from the second retaining structure.

To further understand the techniques, means and effects of the instant disclosure adapted for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

Referring to FIG. 1 to FIG. 12, where the instant disclosure provides a back cover structure Z disposed on the back of the portable electronic device P (such as a cell phone), comprising: a cover body 1, a replaceable adornment 2 (such as a replaceable decoration) and a switching structure 3 (such as a rotary switching structure).

The cover body 1 has an outer surface 100, an inner surface 101 opposite to the outer surface 100 and facing the portable electronic device P, and a through hole 102 passing through the cover body 1 and connected between the outer surface 100 and the inner surface 101. The outer surface 100 has a first inlet 1000 communicated with the through hole 102, the inner surface 101 has a second inlet 1010 communicated with the through hole 102, and the first inlet 1000 of the outer surface 100 is opposite to the second inlet 1010 of the outer surface 101. The cover body 1 has two retaining blocks 10 corresponding to each other and disposed on the inner surface of the through hole 102.

The replaceable adornment 2 can be detachably embedded in the through hole 102 from the first inlet 1000 of the outer surface 100 of the cover body 1. For example, the replaceable adornment 2 may be a pendant, and the replaceable adornment 2 includes a base seat 20 detachably embedded in the through hole 102 and a plurality of diamonds 21 embedded on the base seat 20 and exposed from the first inlet 1000 of the outer surface 100 of the cover body 1. More precisely, the base seat 20 has a two retaining grooves 200 respectively corresponding to the two retaining blocks 10. When the replaceable adornment 2 has been embedded in the through hole 102 from the first inlet 1000 of the outer surface 100 of the cover body 1, the two retaining blocks 10 are respectively mated with the two retaining grooves 200 for preventing the base seat 20 from being rotating (as shown FIG. 9 and FIG. 10), thus the base seat 20 can be positioned in the through hole 102. Moreover, the base seat 20 has a first retaining structure 201 disposed on the bottom side of the base seat 20 and a necklace hole 202 passing through the base seat 20 (as shown in FIG. 13).

Figure 1:
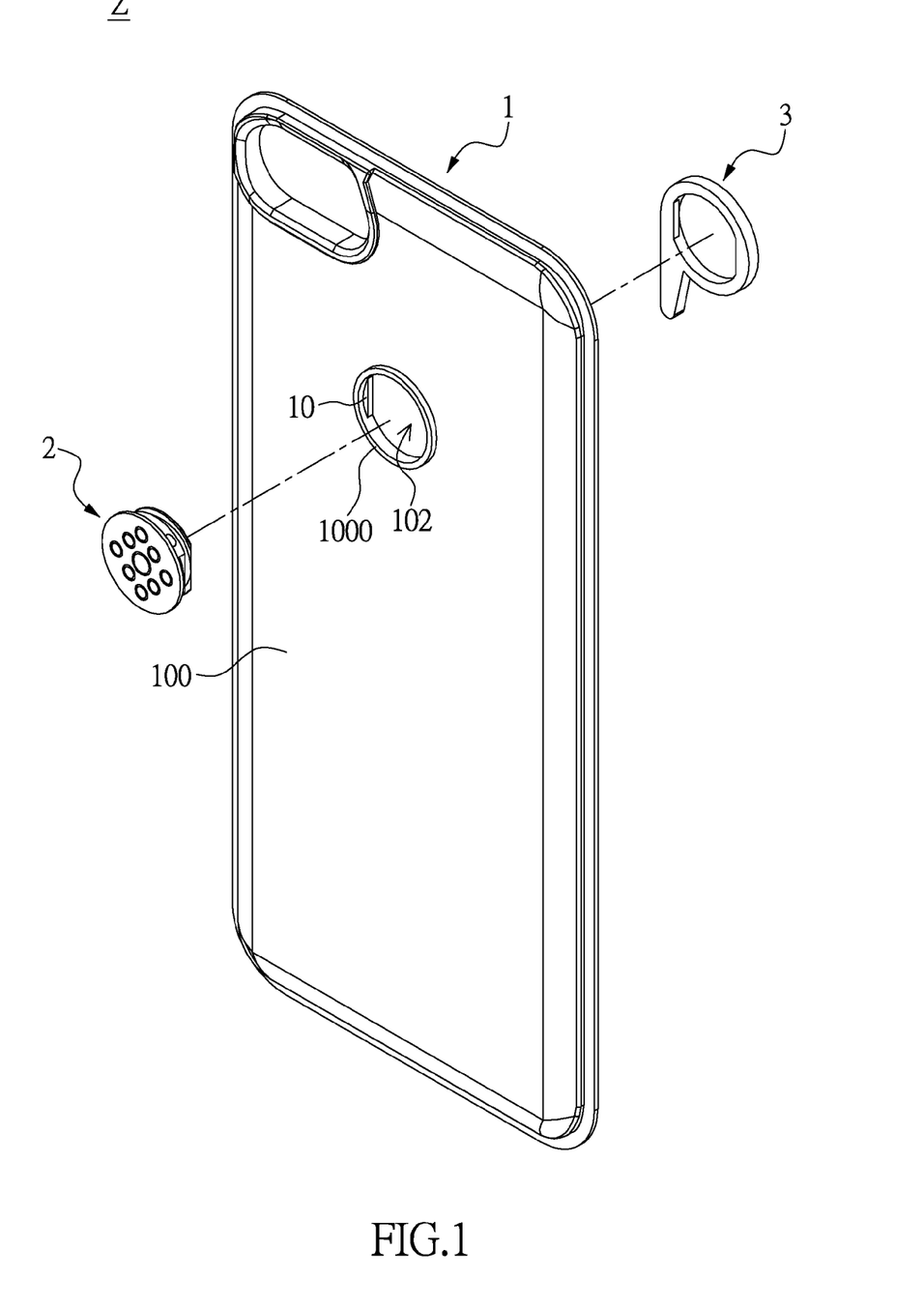
FIG. 1 shows a perspective, exploded, schematic view of the back cover structure disposed on the back of the portable electronic device according to the instant disclosure.
Figure 2:
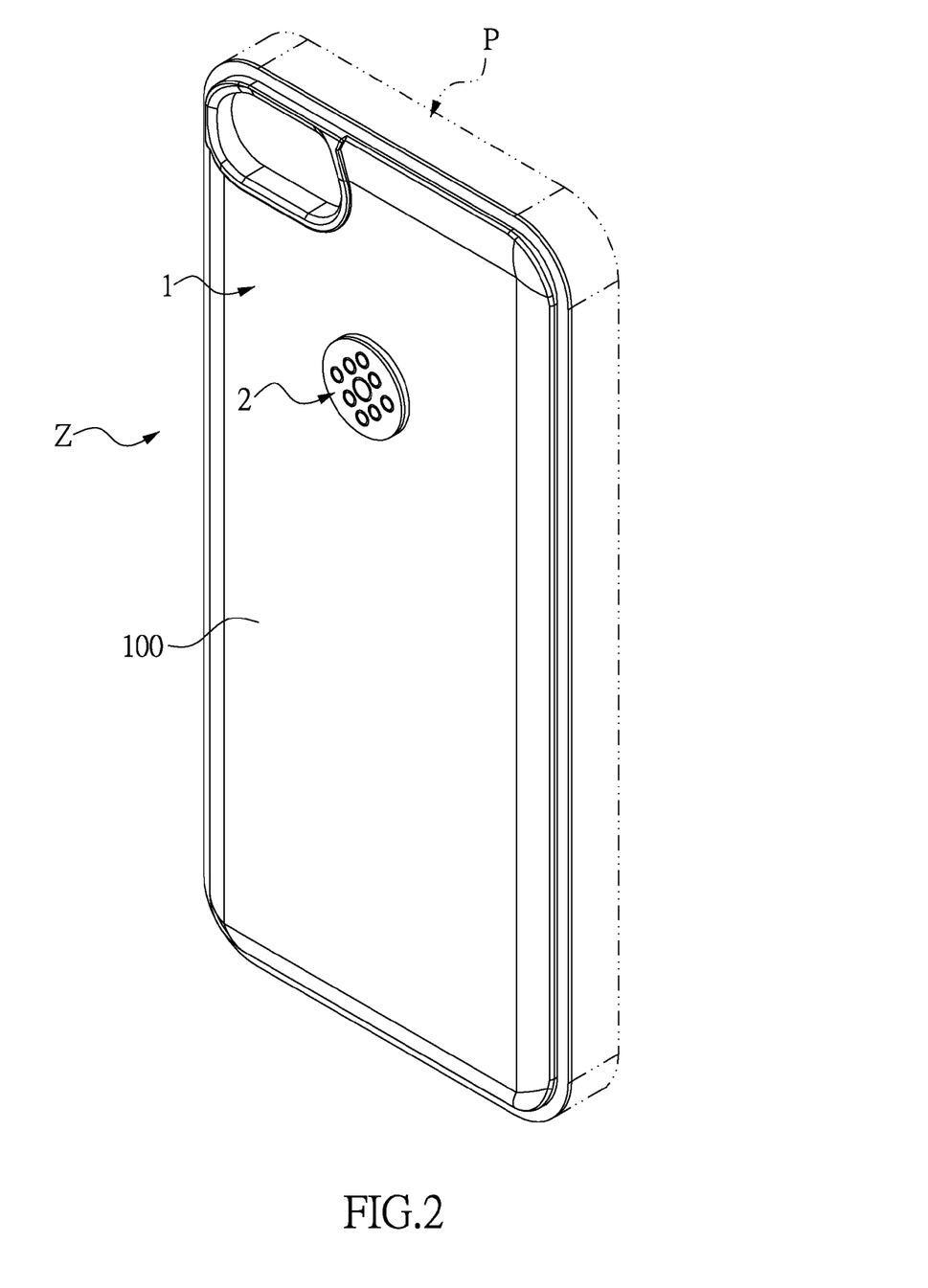
FIG. 2 shows a perspective, assembled, schematic view of the back cover structure disposed on the back of the portable electronic device according to the instant disclosure.
Figure 3:
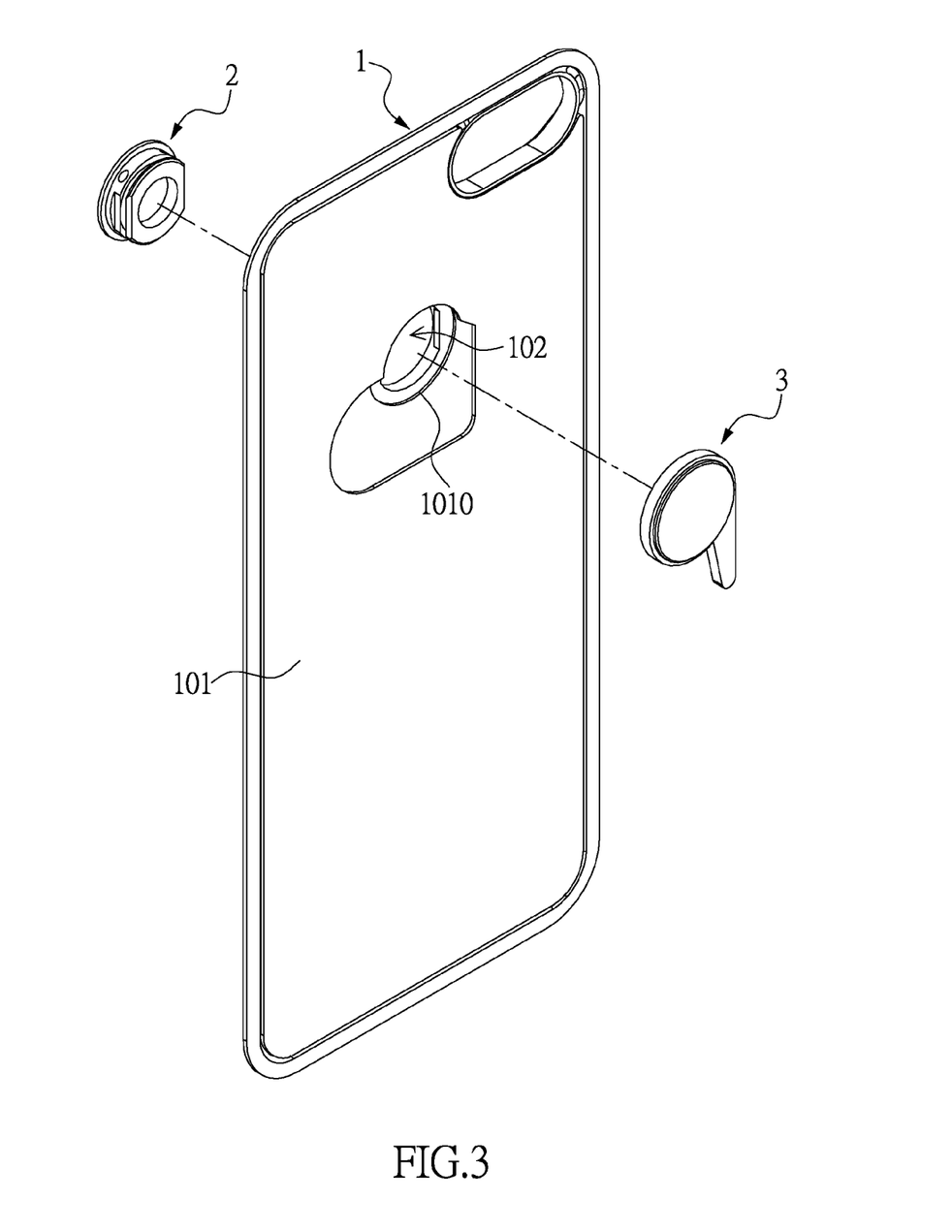
FIG. 3 shows another perspective, exploded, schematic view of the back cover structure disposed on the back of the portable electronic device according to the instant disclosure.
Figure 4:
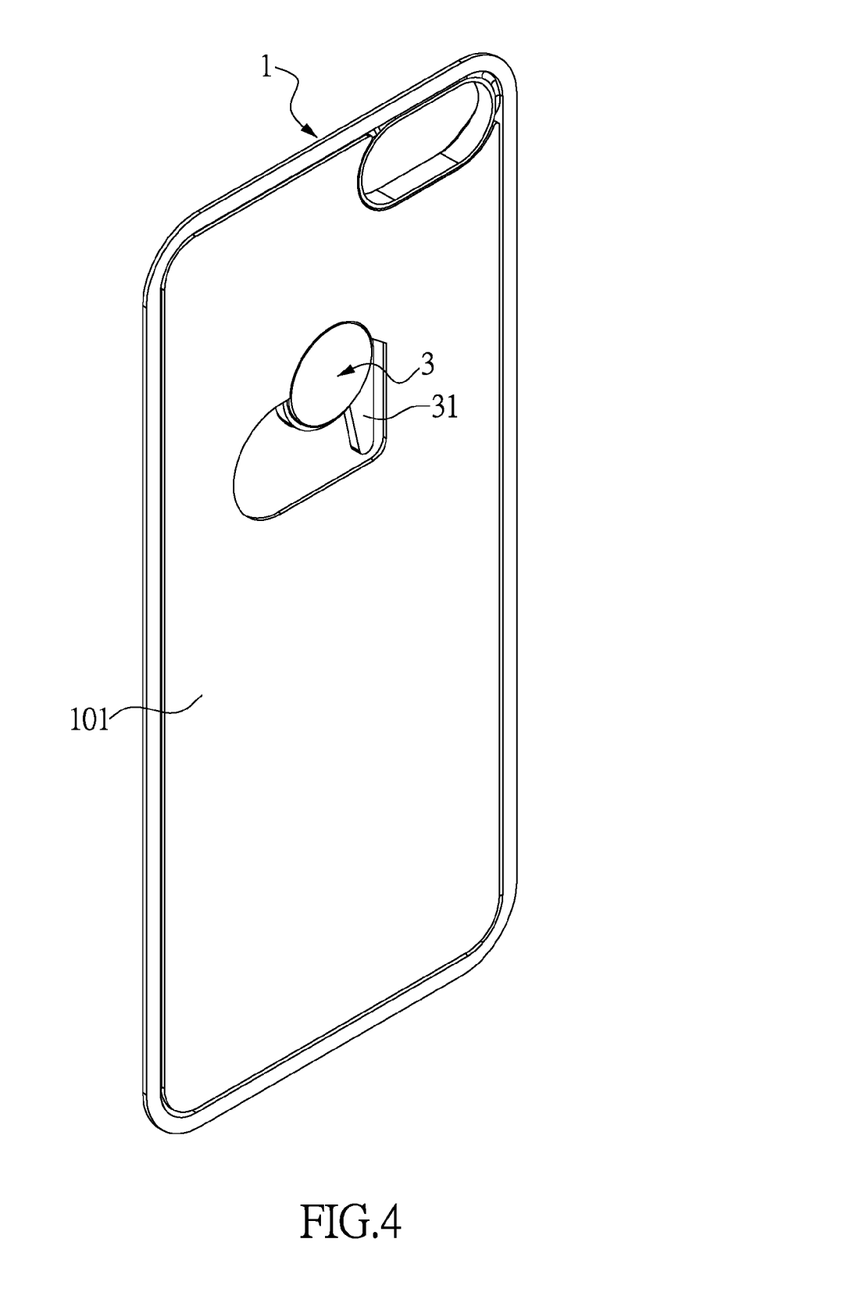
FIG. 4 shows another perspective, assembled, schematic view of the back cover structure disposed on the back of the portable electronic device according to the instant disclosure.
Figure 5:
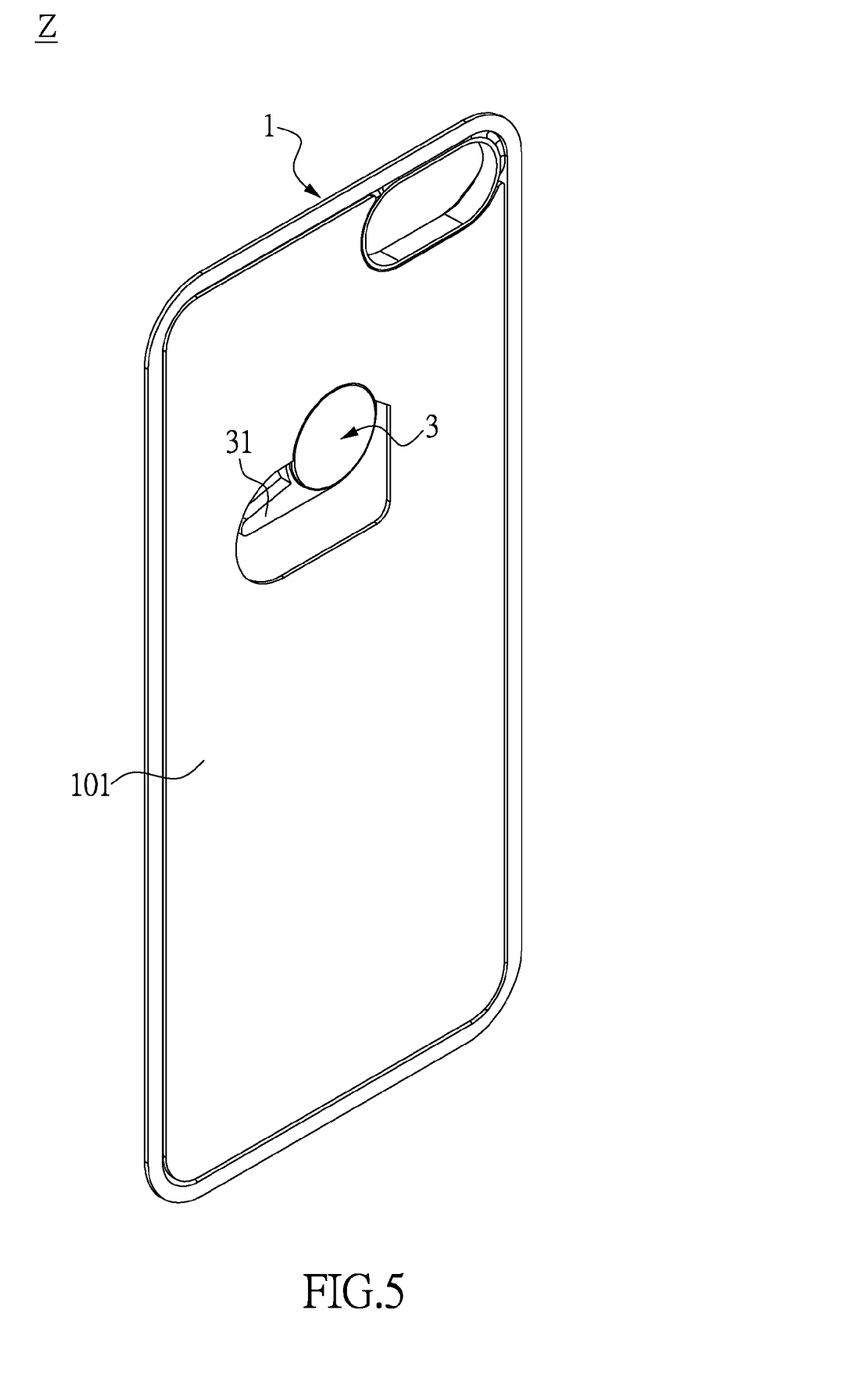
FIG. 5 shows a perspective, schematic view of the switching structure disposed on the inner surface of the cover body to secure the replaceable adornment according to the instant disclosure.
Figure 6:
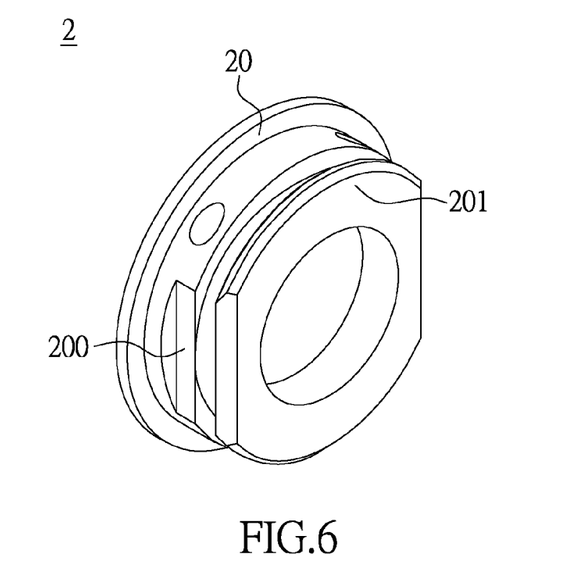
FIG. 6 shows a perspective, schematic view of the replaceable adornment according to the instant disclosure.
Figure 7:
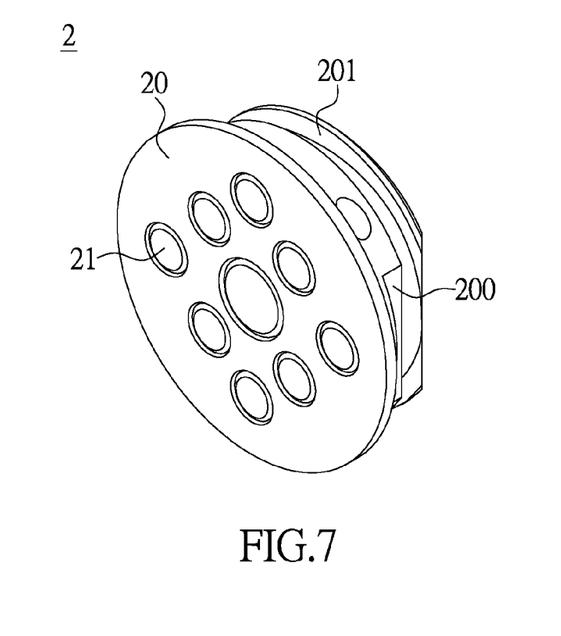
FIG. 7 shows another perspective, schematic view of the replaceable adornment according to the instant disclosure.
Figure 8:
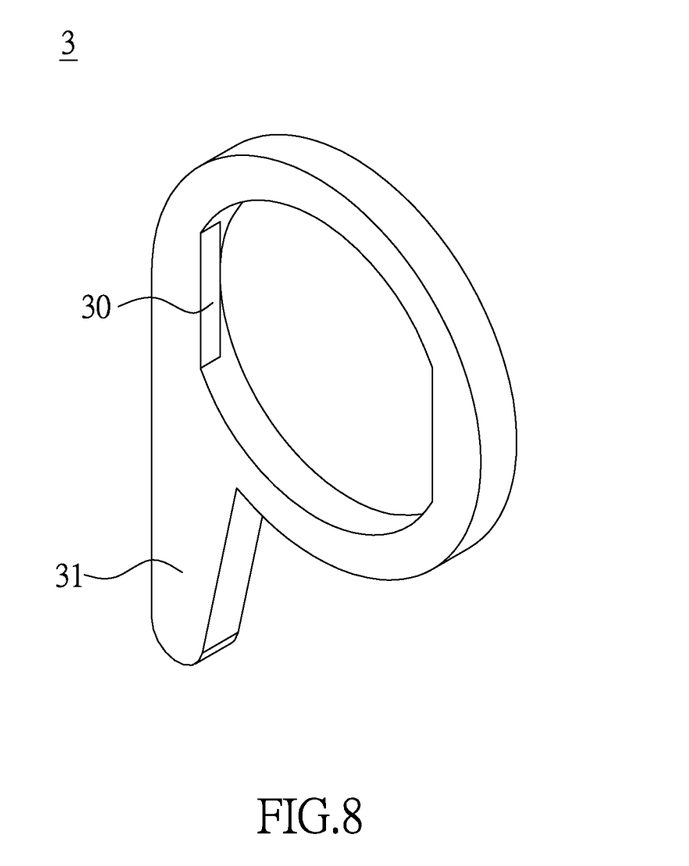
FIG. 8 shows a perspective, schematic view of the switching structure according to the instant disclosure.
Figure 9:
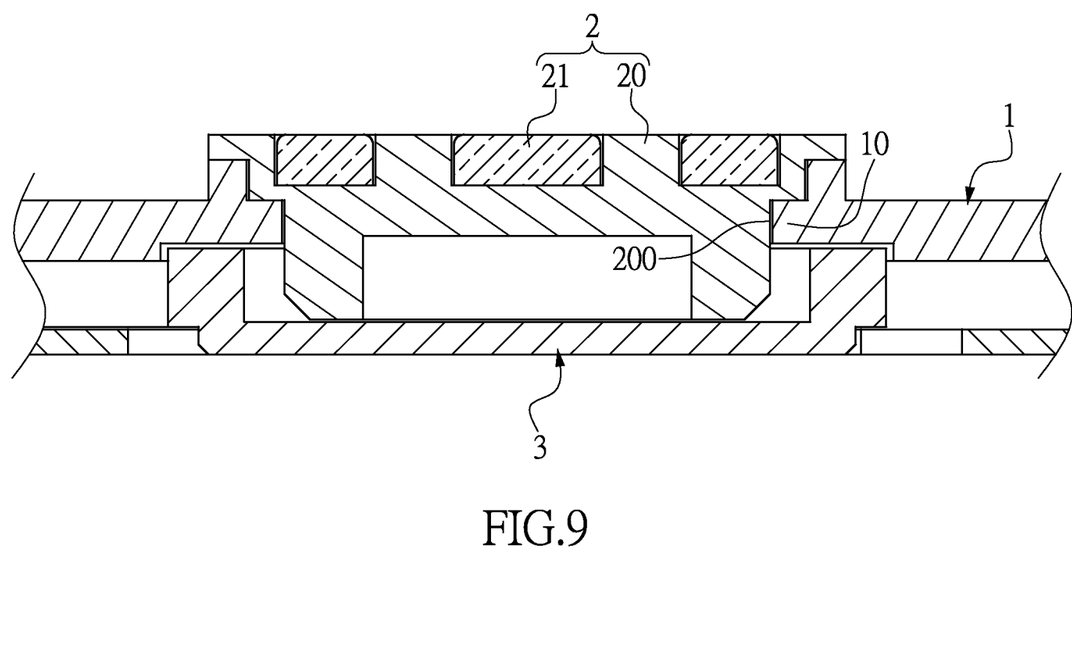
FIG. 9 shows a cross-sectional view of the two retaining blocks respectively mated with the two retaining grooves for preventing the base seat from being rotating while the switching structure is rotated to release the replaceable adornment.
Figure 10:
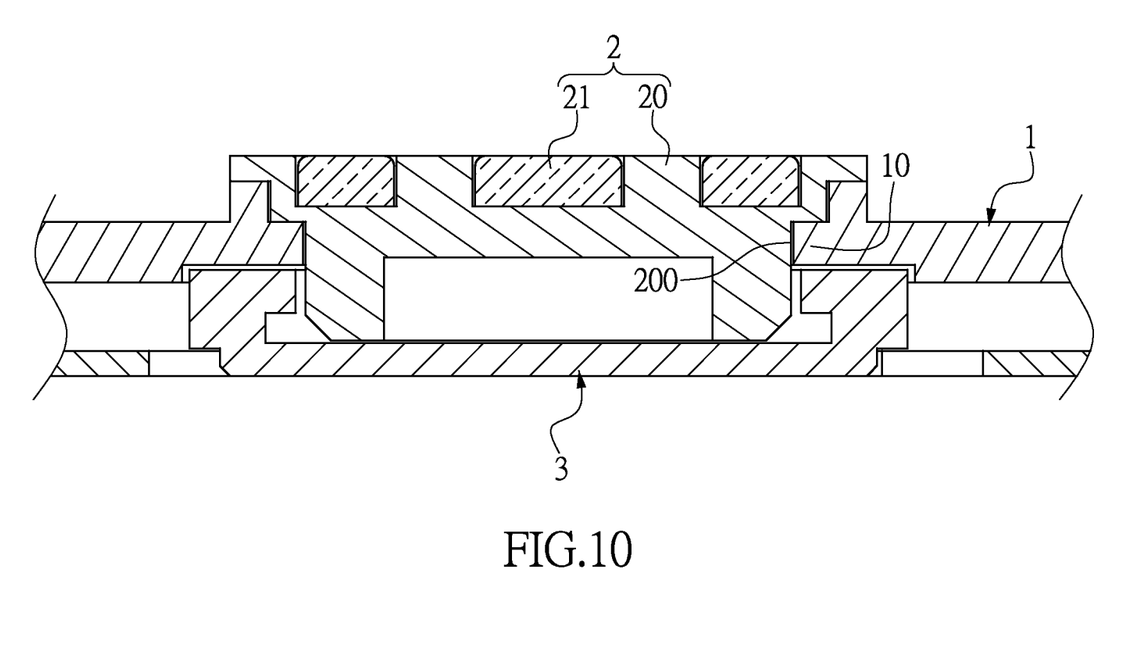
FIG. 10 shows a cross-sectional view of the two retaining blocks respectively mated with the two retaining grooves for preventing the base seat from being rotating while the switching structure is rotated to securing the replaceable adornment.
Figure 11:
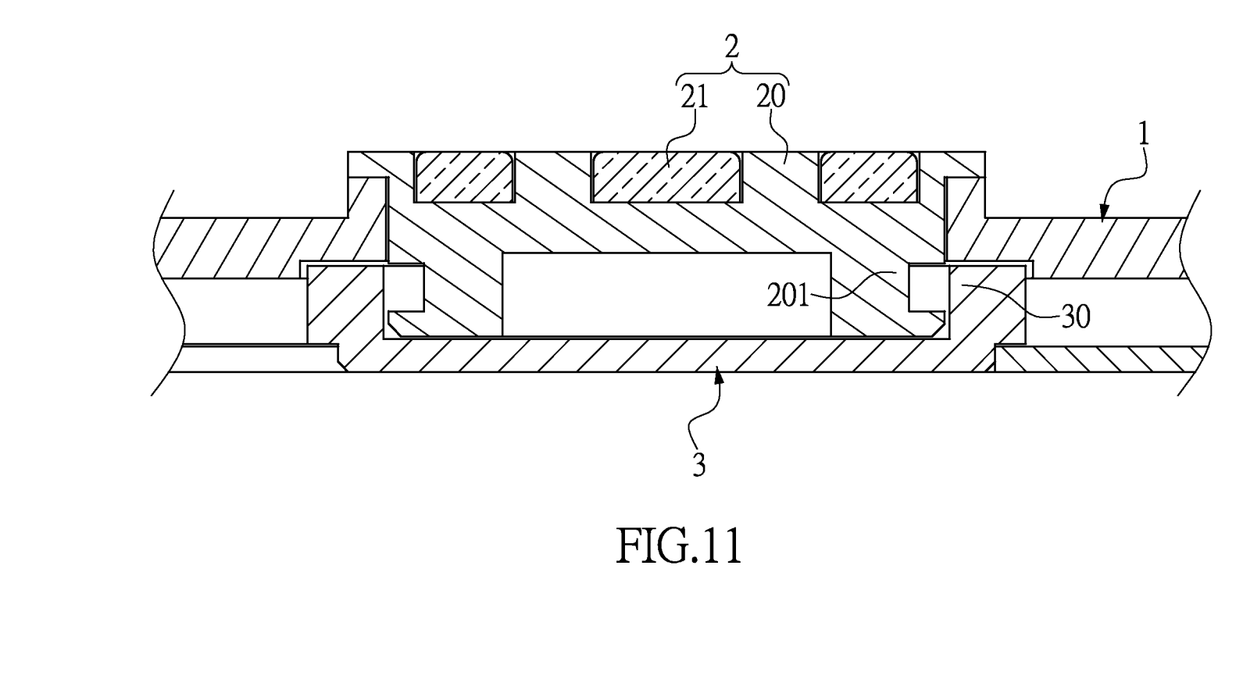
FIG. 11 shows a cross-sectional view of the first retaining structure separated from the second retaining structure while the switching structure is rotated to release the replaceable adornment.
Figure 12:
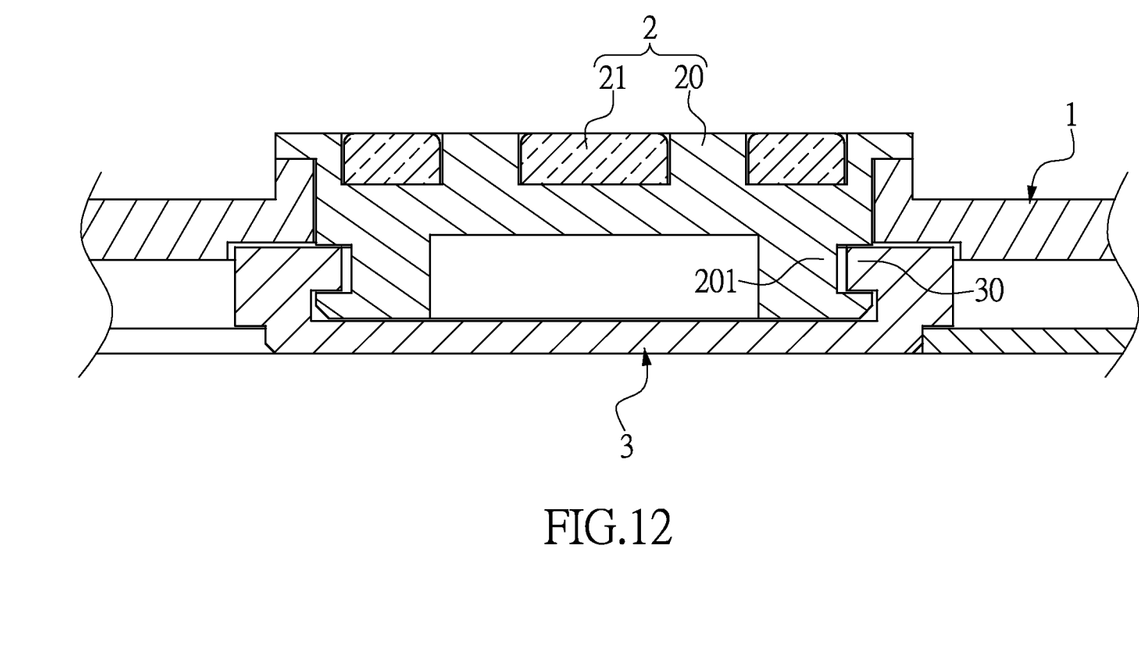
FIG. 12 shows a cross-sectional view of the first retaining structure mated with the second retaining structure while the switching structure is rotated to securing the replaceable adornment.

The switching structure 3 has a second retaining structure 30 corresponding to the first retaining structure 201, and the switching structure 3 can be disposed on the inner surface 101 of the cover body 1 to secure the replaceable adornment 2 (as shown in FIG. 12) or release the replaceable adornment 2 (as shown in FIG. 11). More precisely, when the switching structure 3 is rotated to a unlock position by rotating the rotation bar 31 (as shown in FIG. 4 and FIG. 11), the replaceable adornment 2 can be disposed in the through hole 102 from the first inlet 100 of the outer surface 100 of the cover body 1. When the switching structure 3 is rotated to a lock position by rotating the rotation bar 31 (as shown in FIG. 5 and FIG. 12), the replaceable adornment 2 is retained in the through hole 102 of the cover body 1 by matching the first retaining structure 201 and the second retaining structure 30 (as shown in FIG. 12, the first retaining structure 201 may be a retaining block or a retaining groove, and the second retaining structure 30 may be a retaining block or a retaining groove).

Figure 13:
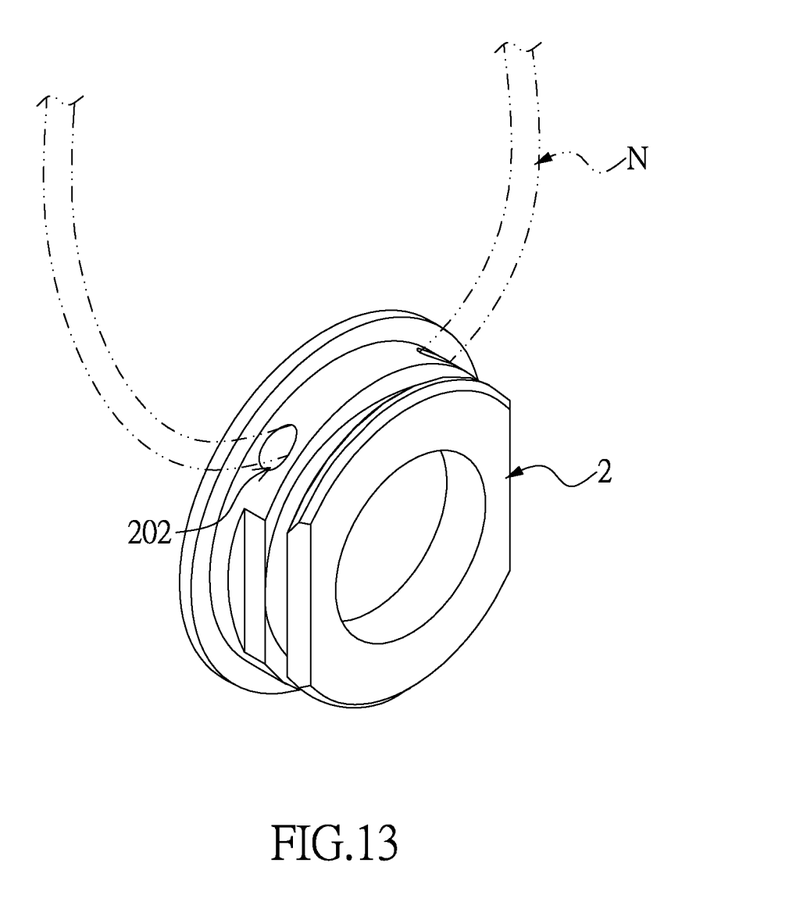
FIG. 13 shows a perspective, schematic view of the necklace passing through the necklace hole of the base seat of the replaceable adornment according to the instant disclosure.
Figure 14:
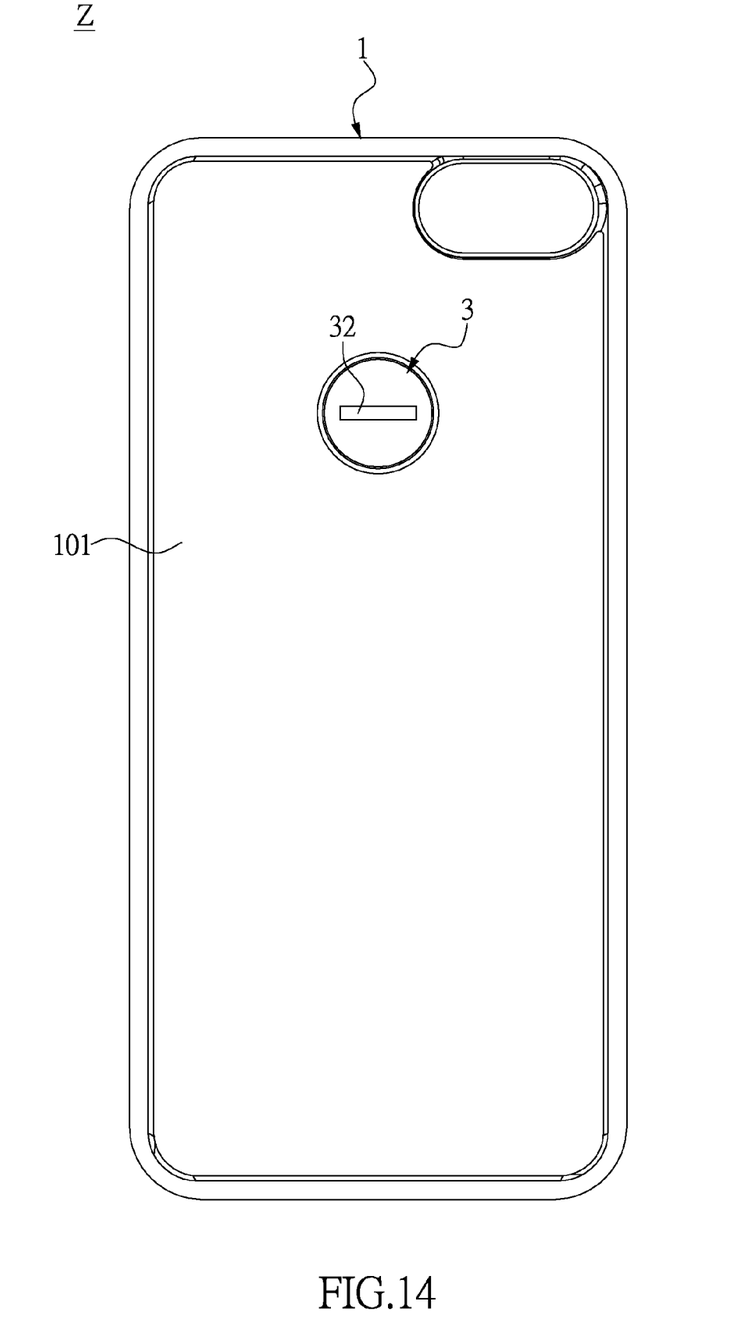
FIG. 14 shows a front view of the rotation bar of the switching structure replaced by the rotation notch according to the instant disclosure.

Referring to FIG. 13, when the replaceable adornment 2 is detached from the cover body 1, the user can use a necklace N to pass through the necklace hole 202, thus the user can wear the necklace N with the replaceable adornment 2. Referring to FIG. 14, the rotation bar 31 can be replaced by a rotation notch 32. When the user uses his/her fingernail to insert into the rotation notch 32, the user can use his/her fingernail to rotate the switching structure 3 to a unlock position or a lock position.

In other words, the instant disclosure provides a back cover structure Z disposed on the back of the portable electronic device P, comprising: a cover body 1, a plurality of replaceable adornments 2 and a switching structure 3. The cover body 1 has an outer surface 100, an inner surface 101 opposite to the outer surface 100 and facing the portable electronic device P, and a through hole 102 passing through the cover body 1 and connected between the outer surface 100 and the inner surface 101. The replaceable adornments 2 are applied to the cover body 1, and any one of the replaceable adornments 2 is adapted to and detachably disposed in the through hole 102 of the cover body 1 according to different requirements. The switching structure 3 is disposed on the inner surface 101 of the cover body 1 to secure the replaceable adornment 2 on the cover body 1 or release the replaceable adornment 2 from the cover body 1.

More precisely, each replaceable adornment 2 includes a base seat 20 detachably embedded in the through hole 102 and a plurality of diamonds 21 disposed on or embedded in the base seat 20 and exposed from the first inlet 1000 of the outer surface 100 of the cover body 1. In addition, the switching structure 3 can be rotated form a unlock position to a lock position for securing the replaceable adornment 2 in the through hole 102 of the cover body 1 by matching the first retaining structure 201 with the second retaining structure 30, or the switching structure 3 can be rotated from a lock position to a unlock position for releasing the replaceable adornment 2 from the cover body 1 by separating the first retaining structure 201 from the second retaining structure 30. In addition, as shown in FIG. 4 and FIG. 5, the switching structure 3 has a rotation bar 31 for rotating the switching structure 3 by a finger to secure the replaceable adornment 2 on the cover body 1 or release the replaceable adornment 2 from the cover body 1. As shown in FIG. 14, the switching structure 3 has a rotation notch 32 for rotating the switching structure 3 by a fingernail to secure the replaceable adornment 2 on the cover body 1 or release the replaceable adornment 2 from the cover body 1. As shown in FIG. 13, when the replaceable adornment 2 is released from the cover body 1 for separating the replaceable adornment 2 from the cover body 1, and the necklace N can pass through the necklace hole 202 of the base seat 20 of the replaceable adornment 2.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A back cover structure disposed on the back of a portable electronic device, comprising:

a cover body having an outer surface, an inner surface opposite to the outer surface and facing the portable electronic device, and a through hole passing through the cover body and connected between the outer surface and the inner surface;

a plurality of replaceable adornments applied to the cover body, wherein one of the replaceable adornments is detachably disposed in the through hole of the cover body; and a switching structure disposed on the inner surface of the cover body to secure the replaceable adornment on the cover body or release the replaceable adornment from the cover body;

wherein the outer surface of the cover body has a first inlet communicated with the through hole of the cover body, each replaceable adornment includes a base seat detachably embedded in the through hole and a plurality of diamonds disposed on the base seat and exposed from the first inlet of the outer surface of the cover body.

2. The back cover structure of claim 1, wherein the inner surface of the cover body has a second inlet communicated with the through hole of the cover body, the first inlet of the outer surface is opposite to the second inlet of the inner surface, and the replaceable adornment is embedded in the through hole from the first inlet of the outer surface of the cover body.

3. The back cover structure of claim 1, wherein the cover body has two retaining blocks corresponding to each other and disposed on the inner surface of the through hole, the base seat has a two retaining grooves respectively corresponding to the two retaining blocks, and the two retaining blocks are respectively mated with the two retaining grooves for securing the base seat in the through hole and preventing the base seat from being rotated.

4. The back cover structure of claim 1, wherein the base seat has a first retaining structure disposed on the bottom side of the base seat and a necklace hole passing through the base seat, and the switching structure has a second retaining structure corresponding to the first retaining structure of the base seat.

5. The back cover structure of claim 4, wherein the switching structure is rotated form a unlock position to a lock position for securing the replaceable adornment in the through hole of the cover body by matching the first retaining structure with the second retaining structure.

6. The back cover structure of claim 4, wherein the switching structure is rotated from a lock position to a unlock position for releasing the replaceable adornment from the cover body by separating the first retaining structure from the second retaining structure.

7. The back cover structure of claim 1, wherein the switching structure has a rotation bar for rotating the switching structure by a finger to secure the replaceable adornment on the cover body or release the replaceable adornment from the cover body.

8. The back cover structure of claim 1, wherein the switching structure has a rotation notch for rotating the switching structure by a fingernail to secure the replaceable adornment on the cover body or release the replaceable adornment from the cover body.

9. A back cover structure disposed on the back of a portable electronic device, comprising:
   a cover body having an outer surface, an inner surface opposite to the outer surface and facing the portable electronic device, and a through hole passing through the cover body and connected between the outer surface and the inner surface;
   a replaceable adornment detachably disposed in the through hole of the cover body; and
   a switching structure disposed on the inner surface of the cover body to secure the replaceable adornment on the cover body or release the replaceable adornment from the cover body;
   wherein the outer surface of the cover body has a first inlet communicated with the through hole of the cover body, the replaceable adornment includes a base seat detachably embedded in the through hole and a plurality of diamonds disposed on the base seat and exposed from the first inlet of the outer surface of the cover body.

10. The back cover structure of claim 9, wherein the inner surface of the cover body has a second inlet communicated with the through hole of the cover body, the first inlet of the outer surface is opposite to the second inlet of the inner surface, and the replaceable adornment is embedded in the through hole from the first inlet of the outer surface of the cover body.

11. The back cover structure of claim 9, wherein the cover body has two retaining blocks corresponding to each other and disposed on the inner surface of the through hole, the base seat has a two retaining grooves respectively corresponding to the two retaining blocks, and the two retaining blocks are respectively mated with the two retaining grooves for securing the base seat in the through hole and preventing the base seat from being rotated.

12. The back cover structure of claim 9, wherein the base seat has a first retaining structure disposed on the bottom side of the base seat and a necklace hole passing through the base seat, and the switching structure has a second retaining structure corresponding to the first retaining structure of the base seat.

13. The back cover structure of claim 12, wherein the switching structure is rotated form a unlock position to a lock position for securing the replaceable adornment in the through hole of the cover body by matching the first retaining structure with the second retaining structure.

14. The back cover structure of claim 12, wherein the switching structure is rotated from a lock position to a unlock position for releasing the replaceable adornment from the cover body by separating the first retaining structure from the second retaining structure.

15. The back cover structure of claim 12, wherein the replaceable adornment is released from the cover body for separating the replaceable adornment from the cover body, and a necklace passes through the necklace hole of the base seat of the replaceable adornment.

16. The back cover structure of claim 9, wherein the switching structure has a rotation bar for rotating the switching structure by a finger to secure the replaceable adornment on the cover body or release the replaceable adornment from the cover body.

17. The back cover structure of claim 9, wherein the switching structure has a rotation notch for rotating the switching structure by a fingernail to secure the replaceable adornment on the cover body or release the replaceable adornment from the cover body.

18. A back cover structure disposed on the back of a portable electronic device, comprising:
   a cover body having an outer surface, an inner surface opposite to the outer surface and facing the portable electronic device, and a through hole passing through the cover body and connected between the outer surface and the inner surface;
   a replaceable adornment adapted to the through hole of the cover body, wherein the replaceable adornment includes a base seat having a necklace hole passing through the base seat; and
   a switching structure disposed on the inner surface of the cover body to release the replaceable adornment from the cover body, wherein the replaceable adornment is separated from the cover body, and a necklace passes through the necklace hole of the base seat of the replaceable adornment.

* * * * *